(12) United States Patent
Wang et al.

(10) Patent No.: US 11,873,009 B2
(45) Date of Patent: Jan. 16, 2024

(54) METHOD, APPARATUS AND CONTROL SYSTEM FOR CONTROLLING MOBILE ROBOT

(71) Applicant: Baidu Online Network Technology (Beijing) Co., Ltd., Beijing (CN)

(72) Inventors: Yue Wang, Beijing (CN); Zelin Wu, Beijing (CN); Jingjing Xue, Beijing (CN); Yingnan Liu, Beijing (CN); Wenlong Rao, Beijing (CN); Shi Hu, Beijing (CN)

(73) Assignee: Apollo Intelligent Driving Technology (Beijing) Co. Ltd., Beijing (CN)

( * ) Notice: Subject to any disclaimer, the term of this patent is extended or adjusted under 35 U.S.C. 154(b) by 646 days.

(21) Appl. No.: 17/025,727

(22) Filed: Sep. 18, 2020

(65) Prior Publication Data

US 2021/0001895 A1 Jan. 7, 2021

Related U.S. Application Data

(63) Continuation of application No. PCT/CN2019/096743, filed on Jul. 19, 2019.

(30) Foreign Application Priority Data

Nov. 20, 2018 (CN) .......................... 201811382006.4

(51) Int. Cl.
*B60W 60/00* (2020.01)
*B60W 30/14* (2006.01)
(Continued)

(52) U.S. Cl.
CPC .... *B60W 60/00184* (2020.02); *B60W 30/146* (2013.01); *G07C 5/008* (2013.01);
(Continued)

(58) Field of Classification Search
CPC ......... B60W 60/00184; B60W 30/146; B60W 2555/60; B60W 2556/50; G07C 5/008; G07C 5/0808
See application file for complete search history.

(56) References Cited

U.S. PATENT DOCUMENTS

| 10,768,631 B2* | 9/2020 | Cheng .................. G05D 1/0257 |
| 2004/0077362 A1* | 4/2004 | Chinomi ............... H04W 76/40 |
| | | 455/575.9 |

(Continued)

FOREIGN PATENT DOCUMENTS

| CN | 104820424 A | 8/2015 |
| CN | 105151045 A | 12/2015 |

(Continued)

OTHER PUBLICATIONS

Extended European Search Report for European Patent Application No. 19887816.7, dated Jun. 14, 2021 (7 pages).

(Continued)

*Primary Examiner* — Jelani A Smith
*Assistant Examiner* — Nada Mahyoob Alqaderi
(74) *Attorney, Agent, or Firm* — Ice Miller LLP (57) ABSTRACT

A method and an apparatus for controlling a mobile robot, and a control system are provided. The method includes: in response to receiving a start request sent by a mobile robot, obtaining at least one of the position information or condition information of the mobile robot; determining a speed limit value of the mobile robot according to the obtained information; and sending a start instruction including the speed limit value to the mobile robot, so as to control the mobile robot to move at a speed smaller than or equal to the speed limit value. The implementation improves the motion safety of a mobile robot.

14 Claims, 5 Drawing Sheets

(51) Int. Cl.
    *G07C 5/00*     (2006.01)
    *G07C 5/08*     (2006.01)

(52) U.S. Cl.
    CPC ....... *G07C 5/0808* (2013.01); *B60W 2555/60* (2020.02); *B60W 2556/50* (2020.02)

(56) References Cited

U.S. PATENT DOCUMENTS

| | | | |
|---|---|---|---|
| 2005/0093507 A1 | 5/2005 | Silwa | |
| 2017/0116485 A1 | 4/2017 | Mullen | |
| 2017/0368691 A1* | 12/2017 | Li | ............ G05D 1/0221 |
| 2018/0292829 A1* | 10/2018 | Li | ............ G06Q 50/30 |
| 2018/0326995 A1* | 11/2018 | Hiramatsu | ............ G05D 1/0088 |
| 2018/0335777 A1* | 11/2018 | Gibbs | ............ G05D 1/0297 |
| 2019/0126933 A1* | 5/2019 | Jonasson | ............ B60W 40/072 |
| 2021/0001847 A1* | 1/2021 | Baba | ............ G05D 1/028 |
| 2021/0001895 A1* | 1/2021 | Wang | ............ B60W 60/00184 |
| 2021/0024085 A1* | 1/2021 | Kitagawa | ............ B60W 60/001 |

FOREIGN PATENT DOCUMENTS

| | | | | |
|---|---|---|---|---|
| CN | 105589459 A | | 5/2016 | |
| CN | 105739534 A | | 7/2016 | |
| CN | 106227204 A | | 12/2016 | |
| CN | 106828188 A | | 6/2017 | |
| CN | 108482372 A | | 9/2018 | |
| CN | 108482372 A | * | 9/2018 | |
| CN | 108646735 A | | 10/2018 | |
| CN | 109471437 A | | 3/2019 | |
| EP | 3372466 A1 | | 12/2018 | |
| JP | 2012111011 A | | 6/2012 | |
| JP | 2014186694 A | | 10/2014 | |
| JP | 2016051353 A | | 4/2016 | |
| JP | 2018-100004 A | | 6/2018 | |
| WO | WO-2009112105 A2 | * | 9/2009 | ............ B60W 10/06 |
| WO | WO-2009127452 A1 | * | 10/2009 | ............ B60K 6/48 |
| WO | 2017050358 A1 | | 3/2017 | |
| WO | WO-2017050358 A1 | * | 3/2017 | |

OTHER PUBLICATIONS

International Search Report in International Application No. PCT/CN2019/096743, dated Oct. 22, 2019 (4 pages).

* cited by examiner

METHOD, APPARATUS AND CONTROL SYSTEM FOR CONTROLLING MOBILE ROBOT

CROSS-REFERENCE TO RELATED APPLICATION

This application is a continuation of International Application No. PCT/CN2019/096743, filed on Jul. 19, 2019, which claims the priority from Chinese Application No. 201811382006.4, filed on Nov. 20, 2018 by Baidu Online Network Technology (Beijing) Co., Ltd, titled "Method, Apparatus and Control System for Controlling Mobile Robot," The disclosures of the aforementioned application are hereby incorporated by reference in their entireties.

TECHNICAL FIELD

Embodiments of the present disclosure relate to the field of computer technology, and specifically to a method, an apparatus and a control system for controlling a mobile robot.

BACKGROUND

A mobile robot is a machine apparatus that automatically performs work. The mobile robot may accept a command from a person, may run a pre-programmed procedure, and may act according to a principle established with the artificial intelligence technology.

At present, in most situations, the mobile robot tends to automatically determine the motion speed thereof according to an on-site road condition, a pedestrian condition, a vehicle condition, a passenger condition, etc. For example, taking an autonomous driving vehicle as an example, the vehicle speed limit of the autonomous driving vehicle is generally limited according to a lane speed limit of a lane where the vehicle is currently located.

SUMMARY

Embodiments of the present disclosure provide a method, apparatus, and control system for controlling a mobile robot.

According to a first aspect, an embodiment of the present disclosure provides a method for controlling a mobile robot, the method including: in response to receiving a start request sent by the mobile robot, acquiring at least one of position information or condition information of the mobile robot; determining a speed limit value of the mobile robot according to the acquired information; and sending a start command including the speed limit value to the mobile robot, to control the mobile robot to move at a speed smaller than or equal to the speed limit value.

In some embodiments, the acquiring at least one of position information or condition information of the mobile robot includes determining whether the mobile robot is in a movable state; and in response to determining the mobile robot being in the movable state, acquiring at least one of the position information or the condition information of the mobile robot.

In some embodiments, the start request includes an identification of the mobile robot; and the determining whether the mobile robot is in a movable state includes inputting the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

In some embodiments, the determining a speed limit value of the mobile robot according to the acquired information includes: inputting the acquired information to a speed limit model predetermined for the mobile robot, to obtain the speed limit value of the mobile robot, the speed limit model being configured to represent a corresponding relationship between the speed limit value of the mobile robot and at least one of position information or condition information.

In some embodiments, the sending a start command including the speed limit value to the mobile robot includes sending the start command including the speed limit value to the mobile robot using an over the air technology.

In some embodiments, the method further includes: acquiring a real-time motion speed, real-time position information, real-time condition information and real-time environment information of the mobile robot according to a predetermined frequency; determining a real-time speed limit value of the mobile robot according to the real-time position information, the real-time condition information and the real-time environment information; and in response to determining a speed value of the real-time motion speed being greater than the real-time speed limit value, sending at least one of warning information or a speed reduction command to the mobile robot.

In some embodiments, the mobile robot is an autonomous driving vehicle.

According to a second aspect, an embodiment of the present disclosure provides an apparatus for controlling a mobile robot, the apparatus including: a first acquiring unit, configured to, in response to receiving a start request sent by a mobile robot, acquire at least one of position information or condition information of the mobile robot; a first determining unit, configured to determine a speed limit value of the mobile robot according to the acquired information; and a first sending unit, configured to send a start command including the speed limit value to the mobile robot, to control the mobile robot to move at a speed smaller than or equal to the speed limit value.

In some embodiments, the first acquiring unit includes a determining module, configured to determine whether the mobile robot is in a movable state; and an acquiring module, configured to, in response to determining the mobile robot being in the movable state, acquire at least one of position information or condition information of the mobile robot.

In some embodiments, the start request includes an identification of the mobile robot, and the determining module includes: an inputting submodule, configured to input the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

In some embodiments, the first determining unit includes an inputting module, configured to input the acquired information to a speed limit model predetermined for the mobile robot, to obtain the speed limit value of the mobile robot, the speed limit model being configured to represent a corresponding relationship between the speed limit value of the mobile robot and at least one of position information or condition information.

In some embodiments, the first sending unit includes a sending module, configured to send the start command including the speed limit value to the mobile robot using an over the air technology.

In some embodiments, the apparatus further includes a second acquiring unit, configured to acquire a real-time motion speed, real-time position information, real-time condition information and real-time environment information of the mobile robot according to a predetermined frequency; a second determining unit, configured to determine a real-time speed limit value of the mobile robot according to the real-time position information, the real-time condition information and the real-time environment information; and a second sending unit, configured to, in response to determining a speed value of the real-time motion speed being greater than the real-time speed limit value, send at least one of warning information or a speed reduction command to the mobile robot.

In some embodiments, the mobile robot is an autonomous driving vehicle.

In a third aspect, an embodiment of the present disclosure provides a control system including a mobile robot and a server for providing support to the mobile robot, wherein the mobile robot is configured to send a start request to the server in response to receiving a start command inputted by a user; and the server is configured to acquire at least one of position information or condition information of the mobile robot; determine a speed limit value of the mobile robot according to the acquired information; and send a start command including the speed limit value to the mobile robot.

In some embodiments, the mobile robot is further configured to move at a speed smaller than or equal to a speed limit value.

In some embodiments, the server is further configured to acquire a real-time motion speed, real-time position information, real-time condition information and real-time environment information of the mobile robot according to a predetermined frequency; determine a real-time speed limit value of the mobile robot according to the real-time position information, the real-time condition information and the real-time environment information; and in response to determining a speed value of the real-time motion speed being greater than the real-time speed limit value, send at least one of warning information or a speed reduction command to the mobile robot.

In a fourth aspect, an embodiment of the present disclosure provides an electronic device for controlling a mobile robot, including one or more processors; a storage apparatus storing one or more programs, wherein the one or more programs, when the one or more programs are executed by the one or more processors, cause the one or more processors implement any embodiment of the method for controlling a mobile robot.

In a fifth aspect, an embodiment of the present disclosure provides a computer readable medium for controlling a mobile robot, storing a computer program which, when executed by a processor, implements any embodiment of the method for controlling a mobile robot.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

The present disclosure will be further described below in detail in combination with the accompanying drawings and embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that embodiments in the present disclosure and the features in embodiments may be combined with each other on a non-conflict basis. The present disclosure will be described below in detail with reference to the accompanying drawings and in combination with embodiments.

A method, an apparatus, and a control system for controlling a mobile robot are provided in embodiments of the present disclosure. In response to receiving a start request sent by the mobile robot, at least one of position information or status information of the mobile robot is acquired, a speed limit value of the mobile robot is determined according to the acquired information, and finally, a start instruction including the speed limit value is sent to the mobile robot to control the mobile robot to move at a speed smaller than or equal to a speed limit value equal to the speed limit value, whereby the limited speed of the mobile robot is determined by at least one of the position information or the status information, so that the limited speed of the mobile robot can be remotely controlled, thereby improving the security of the movement of the mobile robot.

Figure 1:
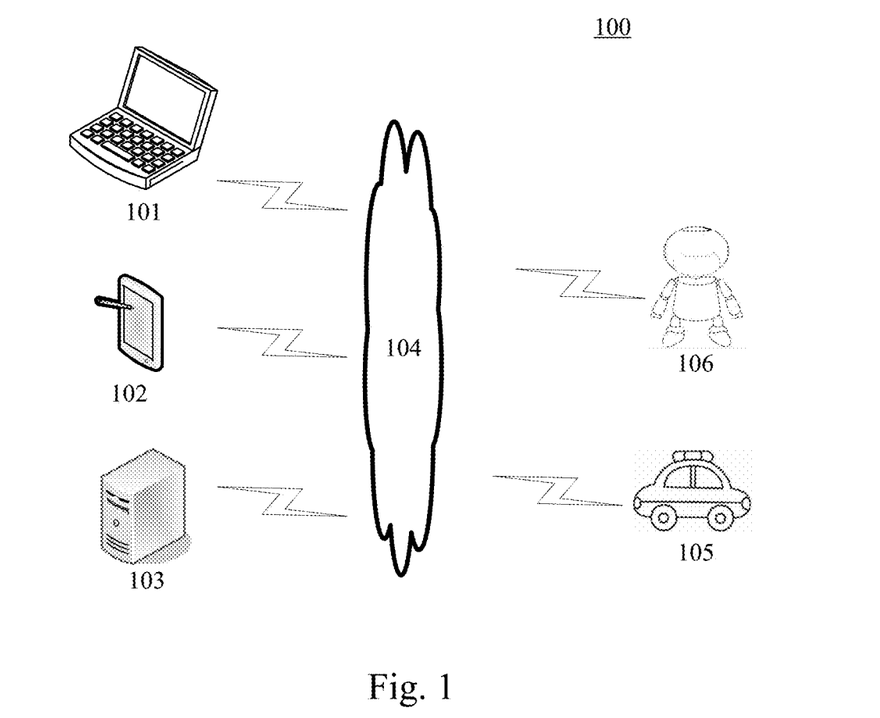
FIG. 1 is an example system architecture in which an embodiment of the present disclosure may be applied.

FIG. 1 illustrates an example system architecture 100 in which an embodiment of a method for controlling a mobile robot or an apparatus for controlling a mobile robot according to embodiments of the present disclosure may be applied.

As shown in FIG. 1, the system architecture 100 may include terminal devices 101 and 102, a server 103, a network 104 and mobile robots 105 and 106. The network 104 serves as a medium providing a communication link between the terminal devices 101 and 102, the server 103 and the mobile robots 105 and 106. The network 104 may include various types of connections, for example, wired or wireless communication links, or optical fiber cables.

The terminal devices 101 and 102, the server 103 and the mobile robots 105 and 106 may interact via the network 104, to receive or send a message, etc. The mobile robots 105 and 106 send position information and condition information thereof to the terminal devices 101 and 102 or the server 103 via the network 104. Various communication client applications (e.g., a data processing application, an image processing application, a webpage browser application, a shopping application, a search application, an instant communication tool, a mailbox client and social platform software) may be installed on the terminal devices 101 and 102.

The terminal devices 101 and 102 may be hardware or software. When being the hardware, the terminal devices 101 and 102 may be various electronic devices, the electronic devices including, but not limited to, a smart phone, a tablet computer, a laptop portable computer, a desktop computer, etc. When being the software, the terminal devices 101 and 102 may be installed in the above listed electronic devices. The terminal devices may be implemented as a plurality of pieces of software or a plurality of software modules (e.g., software pieces or software module for providing distributed services), or may be implemented as a single piece of software or a single software module, which will not be specifically defined here. As an example, the software installed in the terminal devices 101 and 102 may process the received data (e.g., the position information and the condition information of the mobile robots 105 and 106 themselves), and feed back the processing result (e.g., a speed limit value of the mobile robots that is determined based on at least one of the position information or the condition information) to the mobile robots 105 and 106.

The server 103 may be a server providing various services, for example, a backend server processing the data sent by the mobile robots 105 and 106. The backend server may process the received data (e.g., the position information and the condition information of the mobile robots 105 and 106 themselves), and feed back the processing result (e.g., the speed limit value of the mobile robots that is determined based on at least one of the position information or the condition information) to the mobile robots 105 and 106.

It should be noted that the server may be hardware or software. When being the hardware, the server may be implemented as a distributed server cluster composed of a plurality of servers, or may be implemented as a single server. When being the software, the server may be implemented as a plurality of pieces of software or a plurality of software modules (e.g., software or software modules for providing a distributed service), or may be implemented as a single piece of software pieces or a single software module, which will not be specifically defined here.

The mobile robots 105 and 106 may be various movable (i.e., mobile) machine apparatuses. For example, the mobile robots 105 and 106 may include, but not limited to, an aerial robot (e.g., an unmanned aerial vehicle), a wheeled mobile robot (e.g., an autonomous driving vehicle), a walking mobile robot (one-legged, two-legged and multi-legged mobile robots), a tracked mobile robot, a crawling robot, a creeping robot, a swimming robot, a medical robot, a military robot, a disabled-assisted robot, a cleaning robot, etc. The mobile robots 105 and 106 may send a start request to the terminal devices 101 and 102 or the server 103 to request a motion. In addition, the mobile robots 105 and 106 may also send at least one of the position information or the condition information to the terminal devices 101 and 102 or the server 103 for the terminal devices 101 and 102 or the server 103 to determine the speed limit value of the mobile robot. After receiving the start command including the speed limit value, the mobile robots 105 and 106 may move at a speed smaller than or equal to the speed limit value.

It should be noted that the method for controlling a mobile robot provided in embodiments of the present disclosure may be performed by the server 103, and accordingly, the apparatus for controlling a mobile robot may be disposed in the server 103. In addition, the method for controlling a mobile robot provided in embodiments of the present disclosure may alternatively be performed by the terminal devices 101 and 102, and accordingly, the apparatus for controlling a mobile robot may also be disposed in the terminal devices 101 and 102. Alternatively, the method for controlling a mobile robot provided in embodiments of the present disclosure may be performed by the mobile robots 105 and 106, and accordingly, the apparatus for controlling a mobile robot may be also disposed in the mobile robots 105 and 106.

It should be appreciated that the numbers of the terminal devices, the networks, the servers and the mobile robots in FIG. 1 are merely illustrative. Any number of terminal devices, networks, servers and mobile robots may be provided based on actual requirements. When an electronic device on which the method for controlling a mobile robot is implemented does not need to transmit data to an electronic device other than the mobile robots, the system architecture may only include the electronic device on which the method for controlling a mobile robot is implemented and the mobile robots.

Figure 2:
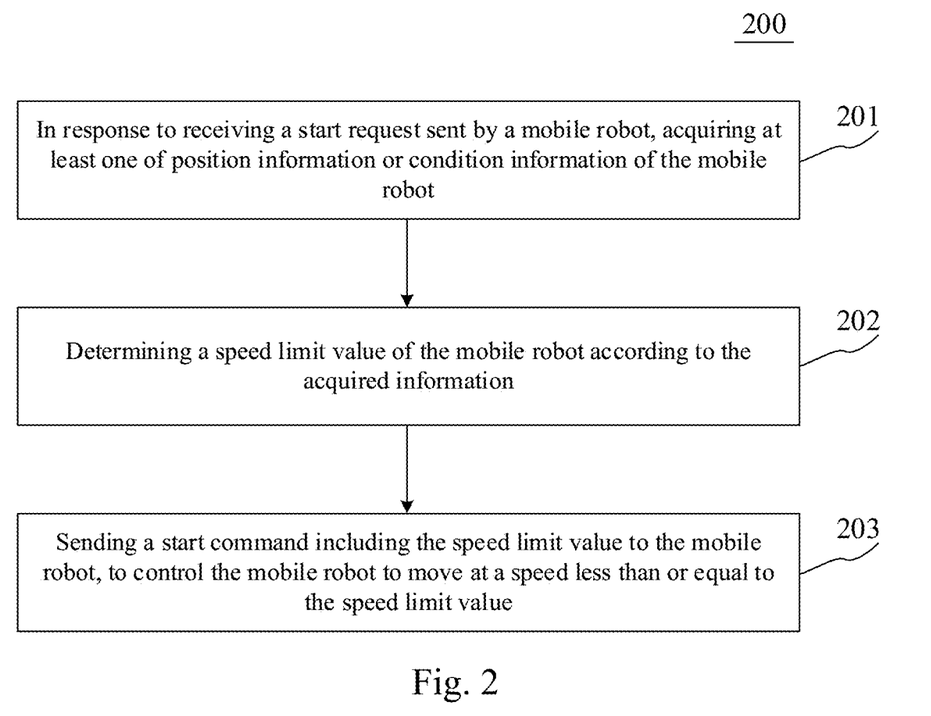
FIG. 2 is a flowchart of an embodiment of a method for controlling a mobile robot according to the present disclosure.

Further referring to FIG. 2, FIG. 2 illustrates a flow 200 of an embodiment of a method for controlling a mobile robot according to the present disclosure. The method for controlling a mobile robot includes the following steps.

Step 201 includes in response to receiving a start request sent by a mobile robot, acquiring at least one of position information or condition information of the mobile robot.

In this embodiment, in response to receiving the start request sent by the mobile robot, an executing body (e.g., the server or the terminal devices shown in FIG. 1) of the method for controlling a mobile robot may acquire at least one of the position information or the condition information of the mobile robot.

The mobile robot may be various movable (i.e., mobile) machine apparatuses. For example, the mobile robot may include, but not limited to, an aerial robot (e.g., an unmanned aerial vehicle), a wheeled mobile robot (e.g., an autonomous driving vehicle), a walking mobile robot (one-legged, two-legged and multi-legged mobile robots), a tracked mobile robot, a crawling robot, a creeping robot, a swimming robot, a medical robot, a military robot, a disabled-assisted robot, a cleaning robot, etc.

In some alternative implementations of this embodiment, the mobile robot may be an autonomous driving vehicle.

The start request may be information sent by the mobile robot to the executing body before beginning to move. The start request may be used to indicate that the mobile robot is about to begin moving. In some use situations, the start request may be sent by the mobile robot to the executing body after the mobile robot receives a start command sent by a user through an electronic device other than the executing body.

The position information may be used to represent the position where the mobile robot is located when the start request is sent or before the start request is sent.

The condition information may be used to represent the condition of the mobile robot when the start request is sent or before the start request is sent. For example, the condition information may include, but not limited to, information on whether there is a fault, information on whether the fault affects a motion, information on a position where a fault point is located, etc.

In some alternative implementations of this embodiment, the step 201 may include the following steps.

Step 1 includes determining whether the mobile robot is in a movable state, in response to receiving the start request sent by the mobile robot.

As an example, the executing body may first determine the time at which the start request is received, in response to receiving the start request sent by the mobile robot. If the determined time is in a time range (e.g., 0 o'clock to 6 o'clock) predetermined for the mobile robot, the executing body may determine that the mobile robot is in an immovable state. If the determined time is not in the time range (e.g., 0 o'clock to 6 o'clock) predetermined for the mobile robot, the executing body may determine that the mobile robot is in the movable state.

In some alternative implementations of this embodiment, the start request may include an identification of the mobile robot. The identification may be a string composed of a number, a letter, a symbol (e.g., an underscore) etc. Thus, the executing body may further perform the step of determining whether the mobile robot is in the movable state as follows.

The identification is inputted to a predetermined motion state model to obtain motion state information. Here, the motion state model is configured to represent a corresponding relationship between an identification of the mobile robot and motion state information of the mobile robot. The motion state information represents that the mobile robot is in the movable state or the immovable state.

As an example, the motion state model may be a two-dimensional table or a database in which identifications of mobile robots and motion state information of the mobile robots are stored. Alternatively, the motion state model may be a configuration file in which the identifications of the mobile robots and the motion state information of the mobile robots are stored.

As another example, the motion state model may alternatively be a model obtained by training an initial model (e.g., a convolutional neural network) using a machine learning algorithm. Here, the technique of training and obtaining a model using the machine learning algorithm is a well-known technique widely studied at present, which will not be repeatedly described here.

In step 2, in response to determining that the mobile robot is in the movable state, at least one of the position information or the condition information is acquired.

Step 202 includes determining a speed limit value of the mobile robot according to the acquired information.

In this embodiment, the executing body may determine the speed limit value of the mobile robot according to the information acquired in step 201 (including at least one of the position information or the condition information). Here, the speed limit value may be a speed value used to represent a maximum speed (which may be a linear speed or an angular speed) at which the mobile robot is allowed move.

In some alternative implementations of this embodiment, the executing body performs step 202 as follows.

The acquired information is inputted to a speed limit model predetermined for the mobile robot, to obtain the speed limit value of the mobile robot. Here, the speed limit model is configured to represent a corresponding relationship between a speed limit value of the mobile robot and at least one of position information or condition information.

Here, when the acquired information includes the position information, and does not include the condition information, the speed limit model may be configured to represent a corresponding relationship between a position information of the mobile robot and a speed limit value of the mobile robot. In this application scenario, the speed limit model may be a two-dimensional table or a database in which the position information of the mobile robot and the speed limit value of the mobile robot are stored. Alternatively, the speed limit model may be a configuration file in which the position information of the mobile robot and the speed limit value of the mobile robot are stored.

When the acquired information includes the condition information and does not include the position information, the speed limit model may be configured to represent a corresponding relationship between condition information of the mobile robot and a speed limit value of the mobile robot. In this application scenario, the speed limit model may be a two-dimensional table or a database in which the condition information of the mobile robot and the speed limit value of the mobile robot are stored. Alternatively, the speed limit model may be a configuration file in which the condition information of the mobile robot and the speed limit value of the mobile robot are stored.

When the acquired information includes the position information and the condition information, the speed limit model may be configured to represent a corresponding relationship between position information and condition information of the mobile robot and a speed limit value of the mobile robot. In this application scenario, the speed limit model may be a two-dimensional table or a database in which the position information and the condition information of the mobile robot and the speed limit value of the mobile robot are stored. Alternatively, the speed limit model may be a configuration file in which the position information and the condition information of the mobile robot and the speed limit value of the mobile robot are stored.

As another example, the speed limit model may alternatively be a model obtained by training an initial model (e.g., a convolutional neural network) using a machine learning algorithm. Here, the technique of training a model using the machine learning algorithm is a well-known technique widely studied at present, which will not be repeatedly described here.

Alternatively, the executing body may further determine the speed limit value of the mobile robot as follows.

When the acquired information includes the position information, the executing body may determine the speed value of a maximum speed at which the mobile robot is allowed to move at the position represented by the position information. For example, when the position is a lane, the speed limit value of the limited speed of the lane at the position may be the speed value of the maximum speed at which the mobile robot is allowed to move. When the acquired information includes the condition information, the executing body may determine the speed value of the speed of the mobile robot moving in the condition represented by the condition information. Thereafter, the executing body may determine a small speed value in the determined speeds as the speed limit value of the mobile robot. It may be appreciated that when the acquired information includes only one of the position information and the condition information, the executing body may determine only one speed value, and in this case, the one speed value determined by the executing body may be the speed limit value of the mobile robot.

Step 203 includes sending a start command including the speed limit value to the mobile robot, to control the mobile robot to move at a speed smaller than or equal to the speed limit value.

In this embodiment, the executing body may send the start command including the speed limit value to the mobile robot, to control the mobile robot to move at the speed smaller than or equal to the speed limit value. Here, the start command may be used to instructs the mobile robot to begin moving.

In some alternative implementations of this embodiment, the executing body may send the start command including the speed limit value to the mobile robot using an over the air technology (OTA).

Here, the over the air technology is a technology in which SIM card data and applications are remotely managed through an air interface of a mobile communication. By using the over the air technology, the operation of sending the start command to the mobile robot may be simplified.

In some alternative implementations of this embodiment, the executing body may further perform the following steps.

First, a real-time motion speed, real-time position information, real-time condition information and real-time environment information of the mobile robot are acquired according to a predetermined frequency.

The real-time motion speed may be the motion speed of the mobile robot when the acquiring step is performed (i.e., the real-time motion speed, the real-time position information, the real-time condition information and the real-time environment information of the mobile robot are acquired according to the predetermined frequency). The real-time position information may be information representing a position where the mobile robot is located when the acquiring step is performed. The real-time condition information may be information representing a condition of the mobile robot when the acquiring step is performed. The real-time environment information may be information representing an environment in which the mobile robot is located when the acquiring step is performed. For example, the real-time environment information may include, but not limited to, at least one of weather information, road condition information, or obstacle position information.

Then, a real-time speed limit value of the mobile robot is determined according to the real-time position information, the real-time condition information and the real-time environment information.

For example, the executing body may search for a real-time speed limit value corresponding to the real-time position information, the real-time condition information, and the real-time environment information in a speed limit two-dimensional table predetermined for the mobile robot. The speed limit two-dimensional table may be configured to represent a corresponding relationship between real-time position information, real-time condition information, real-time environment information and a real-time speed limit value.

Alternatively, the executing body may search for a real-time speed limit value corresponding to the acquired real-time position information in a first speed limit two-dimensional table predetermined for the mobile robot, to use the real-time speed limit value as a first speed limit value. A second speed limit two-dimensional table predetermined for the mobile robot is searched for a real-time speed limit value corresponding to the acquired real-time condition information to be used as a second speed limit value. A third speed limit two-dimensional table predetermined for the mobile robot is searched for a real-time speed limit value corresponding to the acquired real-time environment information to be used a third speed limit value. Then, the minimum speed limit value in the first speed limit value, the second speed limit value and the third speed limit value is determined as the real-time speed limit value of the mobile robot. Here, the first speed limit two-dimensional table may be configured to represent a corresponding relationship between real-time position information and a real-time speed limit value. The second speed limit two-dimensional table may be configured to represent a corresponding relationship between real-time condition information and a real-time speed limit value. The third speed limit two-dimensional table may be configured to represent a corresponding relationship between real-time environment information and a real-time speed limit value.

Finally, in response to determining that the speed value of the real-time motion speed is greater than the real-time speed limit value, at least one of warning information or a speed reduction command is sent to the mobile robot.

Here, the warning information may be information for prompting the mobile robot or the user controlling the mobile robot that the current speed of the mobile robot is too large (e.g., exceeding the maximum speed at which the mobile robot can move at present). The speed reduction command may be information for instructing the mobile robot to decelerate.

Figure 3:
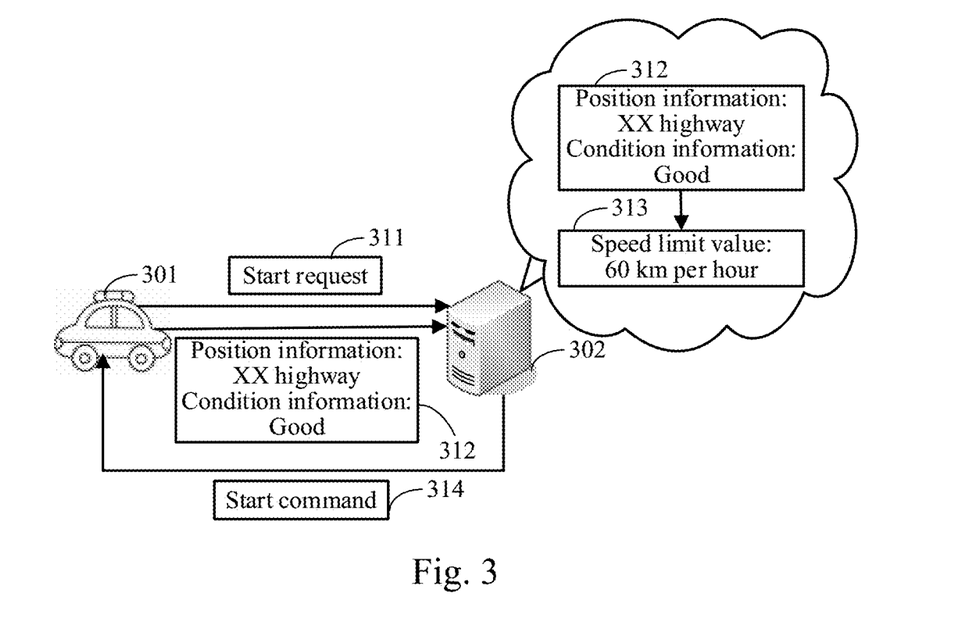
FIG. 3 is a schematic diagram of an application scenario of the method for controlling a mobile robot according to the present disclosure.

Further referring to FIG. 3, FIG. 3 is a schematic diagram of an application scenario of the method for controlling a mobile robot according to the present disclosure. In the application scenario of FIG. 3, when receiving the start request 311 sent by the mobile robot 301 (autonomous driving vehicle in the drawing), the cloud server 302 acquires the position information and the condition information 312 (e.g., "position information: XX highway, condition information: Good" shown in the drawing) of the mobile robot 301. Then, the cloud server 302 determines the speed limit value 313 of the mobile robot 301 according to the acquired information 312 (in the drawing, the cloud server 302 determines that the speed limit value is 60 km per hour based on a two-dimensional table in which position information, condition information, and a speed limit value are stored in advance). Finally, the cloud server 302 sends (e.g., using an over-the-air technology) the start command 314 including the speed limit value to the mobile robot 301, to control the mobile robot to move at a speed smaller than or equal to the speed limit value.

According to the method provided in the above embodiment of the present disclosure, in response to receiving the start request sent by the mobile robot, at least one of the position information or the condition information is acquired. Then, the speed limit value of the mobile robot is determined according to the acquired information, and finally, the start command including the speed limit value is sent to the mobile robot to control the mobile robot to move at the speed smaller than or equal to the speed limit value. Thus, the limited speed of the mobile robot is determined by at least one of the position information or the condition information, thereby realizing remote adjustment of the limited speed of the mobile robot, and improving the safety of the motion of the mobile robot relative to the existing technology (e.g., upon receiving the start command, the mobile robot begins to move at the motion speed indicated by the start command).

Figure 4:
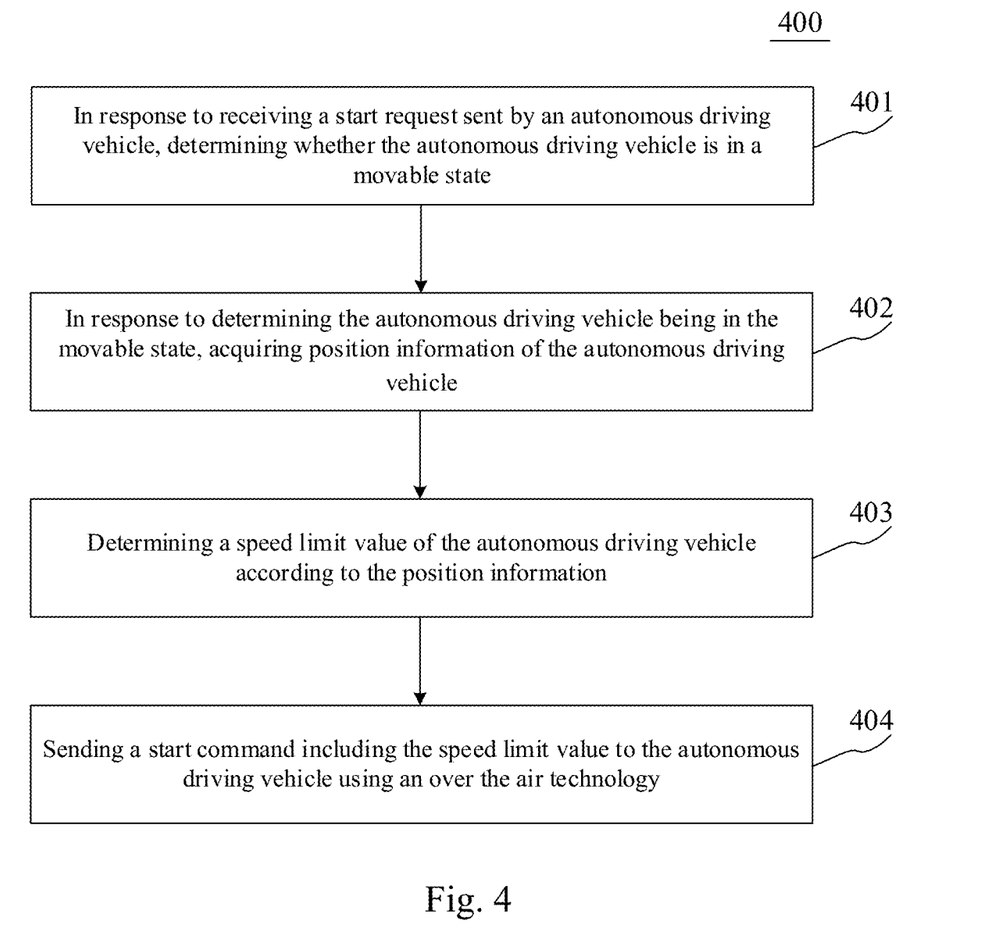
FIG. 4 is a flowchart of another embodiment of the method for controlling a mobile robot according to the present disclosure.

Further referring to FIG. 4, FIG. 4 illustrates a flow 400 of another embodiment of the method for controlling a mobile robot. The flow 400 of the method for controlling a mobile robot includes the following steps.

Step 401 includes in response to receiving a start request sent by an autonomous driving vehicle, determining whether the autonomous driving vehicle is in a movable state.

In this embodiment, in response to receiving the start request sent by the autonomous driving vehicle, an executing body (e.g., the server or the terminal devices shown in FIG. 1) of the method for controlling a mobile robot may determine whether the autonomous driving vehicle is in the movable state.

As an example, the executing body may first determine the time at which the start request is received, in response to receiving the start request sent by the autonomous driving vehicle. If the determined time is in a time range (e.g., 0 o'clock to 6 o'clock) predetermined for the autonomous driving vehicle, the executing body may determine that the autonomous driving vehicle is in an immovable state. If the determined time is not in the time range (e.g., 0 o'clock to 6 o'clock) predetermined for the mobile robot, the executing body may determine that the autonomous driving vehicle is in the movable state.

In some alternative implementations of this embodiment, the start request may include an identification of the autonomous driving vehicle. The identification may be a string composed of a number, a letter, a symbol (e.g., an underscore) etc. Thus, the executing body may further perform the step of determining whether the autonomous driving vehicle is in the movable state as follows.

The identification is inputted to a predetermined motion state model to obtain motion state information. Here, the motion state model is configured to represent a corresponding relationship between an identification of the autonomous driving vehicle and motion state information of the autonomous driving vehicle. The motion state information represents that the autonomous driving vehicle is in the movable state or an immovable state As an example, the motion state model may be a two-dimensional table or a database in which identifications of autonomous driving vehicles and motion state information of the autonomous driving vehicles are stored.

Step 402 includes in response to determining the autonomous driving vehicle being in the movable state, acquiring position information of the autonomous driving vehicle.

In this embodiment, in response to determining that the autonomous driving vehicle is in the movable state, the executing body may acquire the position information of the autonomous driving vehicle. Here, the position information may be used to represent the position where the autonomous driving vehicle is located when the start request is sent or before the start request is sent.

Step 403 includes determining a speed limit value of the autonomous driving vehicle according to the position information.

In this embodiment, the executing body may determine the speed limit value of the autonomous driving vehicle according to the position information.

Here, the executing body may input the position information acquired in step 402 to a speed limit model predetermined for the autonomous driving vehicle to obtain the speed limit value of the autonomous driving vehicle. Here, the speed limit model is configured to represent a corresponding relationship between position information of the autonomous driving vehicle and a speed limit value of the autonomous driving vehicle. The speed limit model may be a two-dimensional table or a database in which the position information of the autonomous driving vehicle and the speed limit value of the autonomous driving vehicle are stored. Alternatively, the speed limit model may be a configuration file in which the position information of the autonomous driving vehicle and the speed limit value of the autonomous driving vehicle are stored.

Step 404 includes sending a start command including the speed limit value to the autonomous driving vehicle using an over the air technology.

In this embodiment, the executing body may send the start command including the speed limit value determined in step 403 to the autonomous driving vehicle by using the over the air technology, to control the autonomous driving vehicle to move at a speed smaller than or equal to the speed limit value. Here, the start command may be used to instruct the autonomous driving vehicle to begin to move.

Here, the over the air technology is a technology in which SIM card data and applications are remotely managed through an air interface of a mobile communication. By using the over the air technology, the operation of sending the start command to the autonomous driving vehicle may be simplified.

It may be seen from FIG. 4 that, as compared with the embodiment corresponding to FIG. 2, the flow 400 of the method for controlling a mobile robot in this embodiment emphasizes the step of determining whether the mobile robot is in the movable state, and the mobile robot is specifically an autonomous driving vehicle, thereby improving the safety of the travelling of the autonomous driving vehicle.

Figure 5:
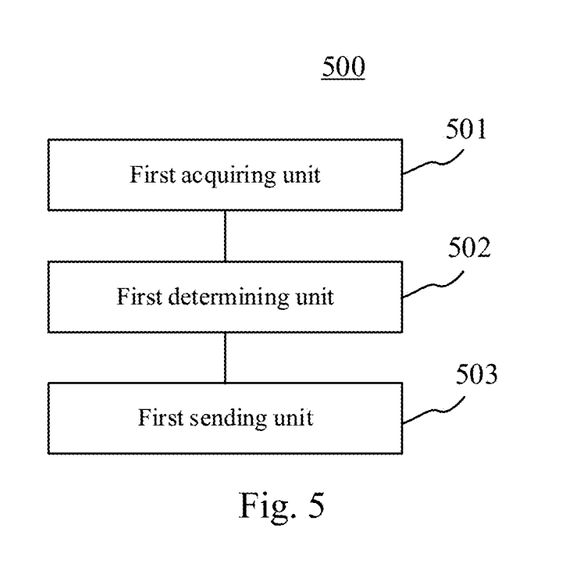
FIG. 5 is a schematic structural diagram of an embodiment of an apparatus for controlling a mobile robot according to the present disclosure.

Further referring to FIG. 5, as an implementation of the method shown in the above drawings, the present disclosure provides an embodiment of an apparatus for controlling a mobile robot. The embodiment of the apparatus corresponds to the embodiment of the method shown in FIG. 2, and may include the feature same as or corresponding to that in the embodiment of the method shown in FIG. 2 in addition to the features described below. The apparatus may be applied in various electronic devices.

As shown in FIG. 5, the apparatus 500 for controlling a mobile robot according to this embodiment includes a first acquiring unit 501, a first determining unit 502, and a first sending unit 503. Here, the first acquiring unit 501 is configured to, in response to receiving a start request sent by a mobile robot, acquire at least one of position information or condition information of the mobile robot. The first determining unit 502 is configured to determine a speed limit value of the mobile robot according to the acquired information. The first sending unit 503 is configured to send a start command including the speed limit value to the mobile robot, to control the mobile robot to move at a speed smaller than or equal to the speed limit value.

In this embodiment, in response to receiving the start request sent by the mobile robot, the first acquiring unit 501 of the apparatus 500 for controlling a mobile robot may acquire at least one of the position information or the condition information of the mobile robot.

The mobile robot may be various movable (i.e., mobile) machine apparatuses. For example, the mobile robot may include, but not limited to, an aerial robot (e.g., an unmanned aerial vehicle), a wheeled mobile robot (e.g., an autonomous driving vehicle), a walking mobile robot (one-legged, two-legged and multi-legged mobile robots), a tracked mobile robot, a crawling robot, a creeping robot, a swimming robot, a medical robot, a military robot, a disabled-assisted robot, a cleaning robot, etc.

In some alternative implementations of this embodiment, the mobile robot may be an autonomous driving vehicle.

The start request may be information sent by the mobile robot to the above apparatus 500 before beginning to move.

The start request may be used to indicate that the mobile robot is about to begin moving. In some use situations, the start request may be sent by the mobile robot to the apparatus 500 after the mobile robot receives a start command sent by a user through an electronic device other than the apparatus 500.

The position information may be used to represent the position where the mobile robot is located when the start request is sent or before the start request is sent.

The condition information may be used to represent the condition of the mobile robot when the start request is sent or before the start request is sent. For example, the condition information may include, but not limited to, information on whether there is a fault, information on whether the fault affects a motion, information on a position where a fault point is located, etc.

In this embodiment, according to the information acquired by the first acquiring unit 501, the first determining unit 502 determine the speed limit value of the mobile robot. Here, the speed limit value may be a speed value used to represent a maximum speed at which the mobile robot is allowed to move.

In this embodiment, the first sending unit 503 may send the start command including the speed limit value to the mobile robot, to control the mobile robot to move at the speed smaller than or equal to the speed limit value. Here, the start command may be used to instructs the mobile robot to begin moving.

In some alternative implementations of this embodiment, the first acquiring unit 501 includes: a determining module (not shown in the drawing), configured to determine whether the mobile robot is in a movable state; and an acquiring module (not shown in the drawing), configured to, in response to determining the mobile robot being in the movable state, acquire at least one of the position information or the condition information of the mobile robot.

In some alternative implementations of this embodiment, the start request includes an identification of the mobile robot. The determining module includes: an inputting sub-module (not shown in the drawing), configured to input the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

In some alternative implementations of this embodiment, the first determining unit includes: an inputting module (not shown in the drawing), configured to input the acquired information to a speed limit model predetermined for the mobile robot, to obtain the speed limit value of the mobile robot, the speed limit model being configured to represent a corresponding relationship between a speed limit value of the mobile robot and at least one of position information or condition information.

In some alternative implementations of this embodiment, the first sending unit includes: a sending module (not shown in the drawing), configured to send the start command including the speed limit value to the mobile robot using an over the air technology.

In some alternative implementations of this embodiment, the apparatus 500 further includes: a second acquiring unit (not shown in the drawing), configured to acquire a real-time motion speed, real-time position information, real-time condition information and real-time environment information of the mobile robot according to a predetermined frequency; a second determining unit (not shown in the drawing), configured to determine a real-time speed limit value of the mobile robot according to the real-time position information, the real-time condition information and the real-time environment information; and a second sending unit (not shown in the drawing), configured to, in response to determining a speed value of the real-time motion speed being greater than the real-time speed limit value, send at least one of warning information or a speed reduction command to the mobile robot.

In some alternative implementations of this embodiment, the mobile robot is an autonomous driving vehicle.

According to the apparatus provided in the above embodiment of the present disclosure, the first acquiring unit 501 acquires at least one of the position information or the condition information of the mobile robot, in response to receiving the start request sent by a mobile robot. Then, the first determining unit 502 determines the speed limit value of the mobile robot according to the acquired information. Finally, the first sending unit 503 sends the start command including the speed limit value to the mobile robot, to control the mobile robot to move at the speed smaller than or equal to the speed limit value. Thus, the apparatus 500 determines the limited speed of the mobile robot by at least one of the position information or the condition information, thereby realizing remote adjustment of the limited speed of the mobile robot, and improving the safety of the motion of the mobile robot relative to the existing technology (e.g., upon receiving the start command, the mobile robot begins to move at the motion speed indicated by the start command).

Figure 6:
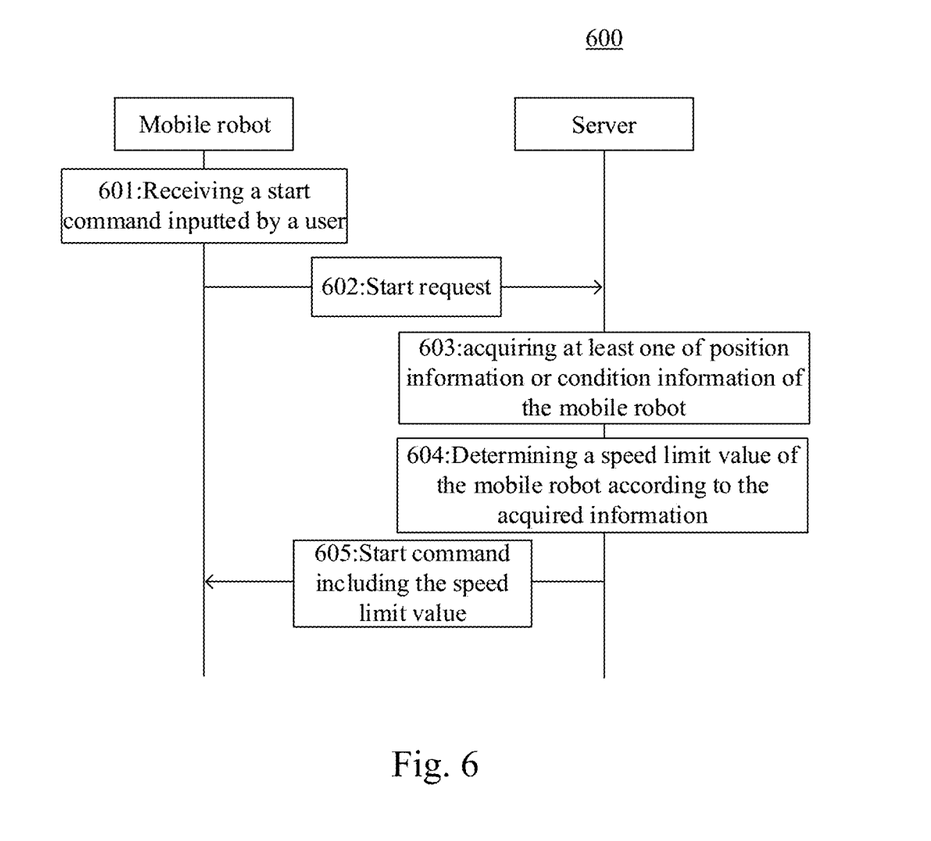
FIG. 6 is a schematic diagram of an interaction process of an embodiment of a control system according to the present disclosure.

Further referring to FIG. 6, FIG. 6 is a schematic diagram of an interaction process of an embodiment of a control system according to the present disclosure.

The control system in embodiments of the present disclosure may include a mobile robot and a server for providing support to the mobile robot. Here, the mobile robot is configured to send a start request to the server in response to receiving a start command inputted by a user. The server is configured to acquire at least one of position information or condition information of the mobile robot; determine a speed limit value of the mobile robot according to the acquired information; and send a start command including the speed limit value to the mobile robot.

As shown in FIG. 6, in step 601, the mobile robot receives the start command inputted by the user.

In this embodiment, the mobile robot may receive the start command inputted by the user.

The mobile robot may be various movable (i.e., mobile) machine apparatuses. For example, the mobile robot may include, but not limited to, an aerial robot (e.g., an unmanned aerial vehicle), a wheeled mobile robot (e.g., an autonomous driving vehicle), a walking mobile robot (one-legged, two-legged and multi-legged mobile robots), a tracked mobile robot, a crawling robot, a creeping robot, a swimming robot, a medical robot, a military robot, a disabled-assisted robot, a cleaning robot, etc. The start command may be used to instructs the mobile robot to begin moving. The start command may be inputted by the user directly to the mobile robot, or may be, sent by a control device to the mobile robot after being inputted by the user to the control device used by the user and communicated with the mobile robot. The server may be a cloud server.

In step 602, the mobile robot sends the start request to the server.

In this embodiment, the mobile robot may send the start request to the server.

The start request may be information sent by the mobile robot to the server before beginning to move. The start request may be used to indicate that the mobile robot is about to begin moving. In some use situations, the start request may be sent by the mobile robot to the server after the mobile robot receives the start command sent by the user through an electronic device other than the server.

Alternatively, the start request may include an identification of the mobile robot. The identification may be a string composed of a number, a letter, a symbol (e.g., an underscore) etc.

In step 603, the server acquires at least one of the position information or the condition information of the mobile robot.

In this embodiment, the server may acquire at least one of the position information or the condition information of the mobile robot.

The position information may be used to represent the position where the mobile robot is located when the start request is sent or before the start request is sent.

The condition information may be used to represent the condition of the mobile robot when the start request is sent or before the start request is sent. For example, the condition information may include, but not limited to, information on whether there is a fault, information on whether the fault affects a motion, information on a position where a fault point is located, etc.

In some alternative implementations of this embodiment, step 603 may include the following steps.

In step 1, in response to receiving by the server the start request sent by the mobile robot, whether the mobile robot is in a movable state is determined.

As an example, the server may first determine the time at which the start request is received, in response to receiving the start request sent by the mobile robot. If the determined time is in a time range (e.g., 0 o'clock to 6 o'clock) predetermined for the mobile robot, the server may determine that the mobile robot is in an immovable state. If the determined time is not in the time range (e.g., 0 o'clock to 6 o'clock) predetermined for the mobile robot, the server may determine that the mobile robot is in the movable state.

In some alternative implementations of this embodiment, the start request may include the identification of the mobile robot. Thus, the server may further perform the step of determining whether the mobile robot is in the movable state as follows.

The identification is inputted to a predetermined motion state model to obtain motion state information. Here, the motion state model is configured to represent a corresponding relationship between an identification of the mobile robot and motion state information of the mobile robot. The motion state information represents that the mobile robot is in the movable state or the immovable state.

As an example, the motion state model may be a two-dimensional table or a database in which identifications of mobile robots and motion state information of the mobile robots are stored. Alternatively, the motion state model may also be a configuration file in which the identifications of the mobile robots and the motion state information of the mobile robots are stored.

In step 2, in response to determining that the mobile robot is in the movable state, at least one of the position information or the condition information is acquired.

In step 604, the server determines a speed limit value of the mobile robot according to the acquired information.

In this embodiment, the server may determine the speed limit value of the mobile robot according to the acquired information. Here, the speed limit value may be a speed value used to represent a maximum speed at which the mobile robot can move.

Here, step 604 is substantially identical to step 202 in the embodiment corresponding to FIG. 2, which will not be repeatedly described here.

In step 605, the server sends the start command including the speed limit value to the mobile robot.

In this embodiment, the server may send the start command including the speed limit value to the mobile robot.

Here, step 605 is substantially identical to step 203 in the embodiment corresponding to FIG. 2, which will not be repeatedly described here.

In some alternative implementations of this embodiment, the mobile robot may move at a speed smaller than or equal to the speed limit value.

In some alternative implementations of this embodiment, the server may perform the following steps.

First, a real-time motion speed, real-time position information, real-time condition information and real-time environment information of the mobile robot are acquired according to a predetermined frequency.

The real-time motion speed may be the motion speed of the mobile robot when the acquiring step is performed (i.e., the real-time motion speed, the real-time position information, the real-time condition information and the real-time environment information of the mobile robot are acquired according to the predetermined frequency). The real-time position information may be information representing a position where the mobile robot is located when the acquiring step is performed. The real-time condition information may be information representing a condition of the mobile robot when the acquiring step is performed. The real-time environment information may be information representing an environment in which the mobile robot is located when the acquiring step is performed. For example, the real-time environment information may include, but not limited to, at least one of weather information, road condition information, or obstacle position information.

Then, a real-time speed limit value of the mobile robot is determined according to the real-time position information, the real-time condition information and the real-time environment information.

For example, the server may search for a real-time speed limit value corresponding to the real-time position information, the real-time condition information, and the real-time environment information in a speed limit two-dimensional table predetermined for the mobile robot. Here, the speed limit two-dimensional table may be configured to represent a corresponding relationship between real-time position information, real-time condition information, real-time environment information and a real-time speed limit value.

Alternatively, the server may search for a real-time speed limit value corresponding to the acquired real-time position information in a first speed limit two-dimensional table predetermined for the mobile robot, to use the real-time speed limit value as a first speed limit value. A second speed limit two-dimensional table predetermined for the mobile robot is searched for a real-time speed limit value corresponding to the acquired real-time condition information to be used as a second speed limit value. A third speed limit two-dimensional table predetermined for the mobile robot is searched for a real-time speed limit value corresponding to the acquired real-time environment information to be used a third speed limit value. Then, the minimum speed limit value in the first speed limit value, the second speed limit value and the third speed limit value is determined as the real-time speed limit value of the mobile robot. Here, the first speed limit two-dimensional table may be configured to represent a corresponding relationship between real-time position information and a real-time speed limit value. The second speed limit two-dimensional table may be configured to represent a corresponding relationship between real-time condition information and a real-time speed limit value. The third speed limit two-dimensional table may be configured to represent a corresponding relationship between real-time environment information and a real-time speed limit value.

Finally, in response to determining that the speed value of the real-time motion speed is greater than the real-time speed limit value, at least one of warning information or a speed reduction command is sent to the mobile robot.

Here, the warning information may be information for prompting the mobile robot or the user controlling the mobile robot that the current speed of the mobile robot is too large (e.g., exceeding the maximum speed at which the mobile robot can move at present). The speed reduction command may be information for instructing the mobile robot to decelerate.

According to the control system provided in embodiments of the present disclosure, first, the mobile robot receives the start command inputted by the user. Then, the mobile robot sends the start request to the server, and then the server acquires at least one of the position information or the condition information of the mobile robot. Afterwards, the server acquires at least one of the position information or the condition information of the mobile robot. Finally, the server sends the start command including the speed limit value to the mobile robot. Thus, the limited speed of the mobile robot is determined by at least one of the position information or the condition information, thereby realizing remote adjustment of the limited speed of the mobile robot, and improving the safety of the motion of the mobile robot relative to the existing technology (e.g., upon receiving the start command, the mobile robot begins to move at the motion speed indicated by the start command).

Figure 7:
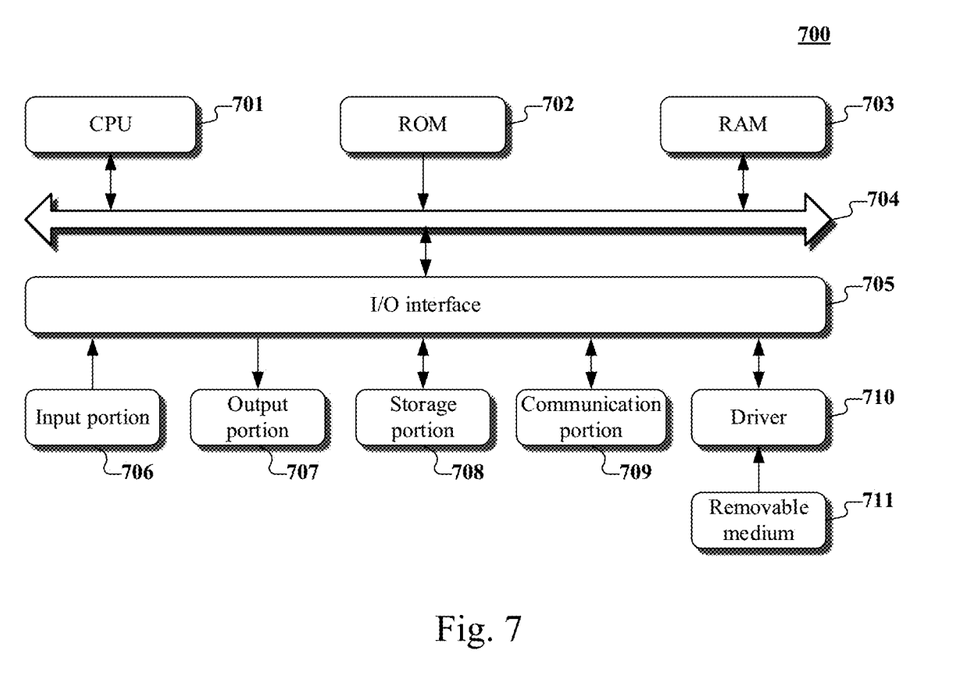
FIG. 7 is a schematic structural diagram of a computer system adapted to implement an electronic device according to embodiments of the present disclosure.

Referring now to FIG. 7, there is shown a schematic structural diagram of a computer system 700 adapted for implementing a server of an embodiment of the present disclosure. The electronic device shown in FIG. 7 is merely an example and should not be construed as limiting the functionality and scope of use of embodiments of the present disclosure.

As shown in FIG. 7, the computer system 700 includes a central processing unit (CPU) 701, which may perform various appropriate actions and processes according to a program stored in a read-only memory (ROM) 702 or a program loaded into a random access memory (RAM) 703 from a storage portion 708. In RAM 703, various programs and data required for the operation of the system 700 are also stored. CPU 701, ROM 702, and RAM 703 are connected to each other via a bus 704. An input/output (I/O) interface 705 is also connected to bus 704.

The following components are connected to the I/O interface 705: An input portion 706 including a keyboard, a mouse, and the like; an output portion 707 including a cathode ray tube (CRT), a liquid crystal display (LCD), and a speaker; a storage portion 708 including a hard disk or the like; and a communication portion 709 including a network interface card such as a LAN card, a modem, or the like. The communication section 709 performs communication processing via a network such as the Internet. The driver 710 is also connected to the I/O interface 705 as desired. A removable medium 711, such as a magnetic disk, an optical disk, a magneto-optical disk, a semiconductor memory, or the like, is mounted on the drive 710 as required so that a computer program read therefrom is mounted on the storage portion 708 as required.

In particular, in accordance with embodiments of the present disclosure, the process described above with reference to the flowchart may be implemented as a computer software program. For example, embodiments of the present disclosure include a computer program product comprising a computer program embodied on a computer readable medium, the computer program comprising program code for performing the method shown in the flowchart. In such embodiments, the computer program may be downloaded and installed from the network through the communication portion 709, and/or installed from the removable medium 711. When the computer program is executed by the central processing unit (CPU) 701, the above functions defined in the method of the present disclosure are performed.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Python, Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The elements described in embodiments of the present disclosure may be implemented by means of software or by means of hardware. The described unit may also be provided in a processor, which may be described, for example, as a processor including a first acquisition unit, a first determination unit, and a first transmission unit. Here, the names of these units do not constitute a limitation on the unit itself in some cases. For example, the first acquisition unit may also be described as a unit for acquiring at least one of position information or condition information of the mobile robot.

In another aspect, the present disclosure further provides a computer readable medium. The computer readable medium may be the computer readable medium included in the apparatus in the above described embodiments, or a stand-alone computer readable medium not assembled into the apparatus. The computer readable medium stores one or more programs. The one or more programs, when executed by a device, cause the device to: in response to receiving a start request sent by the mobile robot, acquire at least one of position information or condition information of the mobile robot; determining a speed limit value of the mobile robot based on the acquired information; and transmitting an activation command including a speed limit value to the mobile robot to control the mobile robot to move at a speed smaller than or equal to the speed limit value.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for controlling a mobile robot, comprising:
    in response to receiving a start request sent by the mobile robot, determining whether the mobile robot is in a movable state; in response to determining the mobile robot being in the movable state, acquiring at least one of position information or condition information of the mobile robot;
    determining a speed limit value of the mobile robot according to the acquired information; and
    sending a start command comprising the speed limit value to the mobile robot, to control the mobile robot to move at a speed smaller than or equal to the speed limit value,
    wherein the start request comprises an identification of the mobile robot, and the determining whether the mobile robot is in a movable state comprises:
    inputting the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

2. The method according to claim 1, wherein the determining a speed limit value of the mobile robot according to the acquired information comprises:
    inputting the acquired information to a speed limit model predetermined for the mobile robot, to obtain the speed limit value of the mobile robot, the speed limit model being configured to represent a corresponding relationship between the speed limit value of the mobile robot and at least one of position information or condition information.

3. The method according to claim 1, wherein the sending a start command comprising the speed limit value to the mobile robot comprises:
    sending the start command comprising the speed limit value to the mobile robot using an over the air technology.

4. The method according to claim 1, further comprising:
    acquiring a real-time motion speed, real-time position information, real-time condition information and real-time environment information of the mobile robot according to a predetermined frequency;
    determining a real-time speed limit value of the mobile robot according to the real-time position information, the real-time condition information and the real-time environment information; and
    in response to determining a speed value of the real-time motion speed being greater than the real-time speed limit value, sending at least one of warning information or a speed reduction command to the mobile robot.

5. The method according to claim 1, wherein the mobile robot is an autonomous driving vehicle.

6. An electronic device, comprising:
    one or more processors; and
    a storage apparatus, configured to store one or more programs,
    wherein the one or more programs, when executed by the one or more processors, cause the one or more processors to perform operations, the operations comprising:
    in response to receiving a start request sent by the mobile robot, determining whether the mobile robot is in a movable state; in response to determining the mobile robot being in the movable state, acquiring at least one of position information or condition information of the mobile robot;
    determining a speed limit value of the mobile robot according to the acquired information; and sending a start command comprising the speed limit value to the mobile robot, to control the mobile robot to move at a speed smaller than or equal to the speed limit value, wherein the start request comprises an identification of the mobile robot, and the determining whether the mobile robot is in a movable state comprises:

inputting the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

7. The electronic device according to claim 6, wherein the determining a speed limit value of the mobile robot according to the acquired information comprises:

inputting the acquired information to a speed limit model predetermined for the mobile robot, to obtain the speed limit value of the mobile robot, the speed limit model being configured to represent a corresponding relationship between the speed limit value of the mobile robot and at least one of position information or condition information.

8. The electronic device according to claim 6, wherein the sending a start command comprising the speed limit value to the mobile robot comprises:

sending the start command comprising the speed limit value to the mobile robot using an over the air technology.

9. The electronic device according to claim 6, wherein the operations further comprise:

acquiring a real-time motion speed, real-time position information, real-time condition information and real-time environment information of the mobile robot according to a predetermined frequency;

determining a real-time speed limit value of the mobile robot according to the real-time position information, the real-time condition information and the real-time environment information; and in response to determining a speed value of the real-time motion speed being greater than the real-time speed limit value, sending at least one of warning information or a speed reduction command to the mobile robot.

10. The electronic device according to claim 6, wherein the mobile robot is an autonomous driving vehicle.

11. A control system, comprising a mobile robot and a server for providing support to the mobile robot, wherein the mobile robot is configured to send a start request to the server in response to receiving a start command inputted by a user, wherein the start request comprises an identification of the mobile robot; and the server is configured to determine whether the mobile robot is in a movable state in response to the start request acquire at least one of position information or condition information of the mobile robot in response to determining that the mobile robot is in the movable state; determine a speed limit value of the mobile robot according to the acquired information; and send a start command comprising the speed limit value to the mobile robot, wherein whether the mobile robot is in a movable state is determined by the server through:

inputting the identification to a predetermined motion state model to obtain motion state information, the motion state model being configured to represent a corresponding relationship between the identification of the mobile robot and the motion state information of the mobile robot, and the motion state information representing that the mobile robot is in the movable state or an immovable state.

12. The system according to claim 11, wherein the mobile robot is further configured to:

move at a speed smaller than or equal to the speed limit value.

13. The system according to claim 11, wherein the server is further configured to:

acquire a real-time motion speed, real-time position information, real-time condition information and real-time environment information of the mobile robot according to a predetermined frequency;

determine a real-time speed limit value of the mobile robot according to the real-time position information, the real-time condition information and the real-time environment information; and in response to determining a speed value of the real-time motion speed being greater than the real-time speed limit value, send at least one of warning information or a speed reduction command to the mobile robot.

14. A non-transitory computer readable medium, storing a computer program, wherein the program, when executed by a processor, implements the method according to claim 1.

* * * * *